United States Patent Office 3,507,887
Patented Apr. 21, 1970

3,507,887
PROCESS OF PREPARING 2-ALKYL QUINIZARINS AND 2-ARYL-METHYLENE QUINIZARINS
Grannis S. Johnson, Englewood, N.J., assignor to GAF Corporation, New York, N.Y., a corporation of Delaware
No Drawing. Filed Oct. 12, 1966, Ser. No. 586,019
Int. Cl. C09b 1/06
U.S. Cl. 260—383                    7 Claims

ABSTRACT OF THE DISCLOSURE 2-alkyl-quinizarins characterized by the following formula:

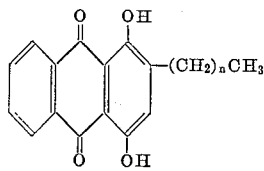

wherein $n$ represents a numeral from 8 to 17. Such compounds are useful as dyestuff intermediates. The 2-alkyl-quinizarins and similar materials are produced by a process which comprises condensing 1 mol of leucoquinizarin with 1 to 1.5 mols of an aldehyde selected from the group consisting of saturated aliphatic aldehydes of from 1 to 18 carbon atoms, aromatic aldehydes containing from 1 to 3 fused benzene rings and heterocyclic aldehydes of the furan series at a temperature ranging from 80° to 125° C. in the presence of a polar organic hydroxy-containing solvent in which the leucoquinizarin and said aldehydes are soluble and in the presence of a negative ion as catalyst selected from the class consisting of hydroxide ions, acetate ions and carbonate ions, for a period of time until the said condensation is complete.

---

This invention relates to an improved process of preparing 2-alkyl quinizarins and 2-aryl-methylene quinizarins, and to a new and useful class of 2-alkyl quinizarins.

The synthesis of 2-alkyl quinizarins and 2-aryl-methylene quinizarins was first described by Marschalk et al., Bull. Soc. Chem. France (Memoirs), pp. 1545–1575 (1936). Yates and Peters, Journal of the Chemical Society, p. 626 (1965), also reported the synthesis of such products. In both reports, the method of synthesis is the same, which consists of adding sodium hydrosulfite to an aqueous alkaline solution of quinizarin to form leucoquinizarin. To the latter, an aldehyde, either aliphatic or aromatic, is added and resutling mixture heated for two hours at 95° C. The resulting product is filtered off, washed free of alkali and dried. Impure materials which are formed are removed from the dry product by recrystallization from benzene. The yields of the pure products are generally rather low. It appears that the reaction is probably incomplete for the reason that the leucoquinizarin is not soluble in the aqeous medium and, furthermore, aldehydes of higher moleclar weight are insoluble in such medium. As a consequence, a heterogeneous system results which is unfavorable for the type of reaction that is involved. Yates and Peters specifically point out that the reaction does not work employing longer chain aliphatic aldehydes above eight carbon atoms.

It is the principal object of the present invention to provide an improved process of preparing 2-alkyl quinizarins and 2-aryl-methylene quinizarins in substantially pure form without resorting to recrystallization procedures and while employing a wide variety of aliphatic, aromatic and heterocyclic aldehydes.

A further object is to provide a new and useful class of 2-alkyl quinizarins.

Other objects and advantages will become manifest from the following description.

I have found that the foregoing objects are attained by condensing 1 mole of leucoquinizarin with 1 mole, preferably with a molar excess, i.e., 1.1 to 1.5 moles, of an aliphatic aldehyde of from 1 to 18 carbon atoms, or an aromatic aldehyde which includes heterocyclic aldehydes, in the presence of a polar organic solvent in which the leucoquinizarin and aldehyde are soluble at a temperature ranging from 80° C. to 125° C. until the condensation reaction is complete. The latter may range from 5 to 40 hours depending upon the nature of the aldehyde employed, longer periods of time, i.e., from 25 to about 35 hours, being required for dichlor-substituted aldehydes. The condensation reaction is preferably conducted in the presence of a basic negative ion catalyst. After the condensation reaction is complete, the reaction mixture is cooled to about room temperature, filtered and the filter cake washed with a lower alcohol to remove the excess aldehyde and then with water or a polar organic solvent. The filter cake is then dried in the normal manner, preferably at about 80–90° C. The yields of pure product range from about 60% to as high as 95% of theory based on leucoquinizarin.

The leucoquinizarin employed in the foregoing condensation reaction was first made from quinizarin by the well-known procedure described in BIOS, p. 17, vol. 1484. After isolation it is simply dried and then condensed with an aldehyde.

The solvents in which the leucoquinizarin and the various aldehydes are soluble are relatively polar organic solvents such as the lower alcohols of from 2 to 4 carbon atoms, Cellosolves and carbitols. Of the latter solvents, I found that carbitol (monoethylether of diethyleneglycol) is the preferred solvent in most cases, since it dissolves the starting materials but not the final condensation product. It will be appreciated, however, that there is here only the normal solvent consideration as one finds in all chemical reactions, and the choice of a solvent is not believed to be greatly restricted and depends on the particular reactants. In one particular condensation reaction, as will be noted hereinafter, I found that n-butanol was also an excellent solvent, in that it dissolved the starting materials but not the product. The main point of consideration is to employ any non-aqueous solvent which dissolves both reactants. By the use of such solvent the final product crystallizes in pure form from the reaction medium.

As pointed out above, the condensation reaction can be accelerated by a basic negative ion catalyst. Materials which have been found to be useful catalysts are the following:

(1) Benzyltrimethylammonium hydroxide (used as a 35% solution in methanol)
(2) Sodium carbonate
(3) Sodium acetate Any organic aldehyde may be employed in the condensation reaction. For example, aliphatic aldehydes of from 1 to 18 carbon atoms may be employed. As examples of such aldehydes, the following are illustrative: formaldehyde, acetaldehyde, propionaldehydet, n-butyraldehyde, isobutyraldehyde, n-valeraldehyde, isovaleraldehyde, n-caproaldehyde, n-heptaldehyde, octanal, nonaldehyde, decanal, laurylaldehyde, stearaldehyde, and the like.

In addition to the above aliphatic aldehydes, aromatic aldehydes which include heterocyclic aldehydes are also employed. As illustrative of such aldehydes, the following may be mentioned: benzaldehyde, m-tolualdehyde, p-tolualdehyde, o-chlorobenzaldehyde, p-chlorobenzaldehyde, o-nitrobenzaldehyde, m-nitrobenzaldehyde, p-nitrobenzaldehyde, o-aminobenzaldehyde, p-aminobenzaldehyde, salicylaldehyde, o-methoxybenzaldehyde, anisaldehyde, p-dimethylaminobenzaldehyde, phenylacetaldehyde, p-cuminaldehyde, 2,6-dichlorobenzaldehyde, 2,4-dichlorobenzaldehyde, p-thymol aldehyde, β-naphthaldehyde, 9-anthraaldehyde, vanillin, veratraldehyde, piperonal, β-resorcylaldehyde, 2-furaldehyde, tetrahydrofurfural, 5-aldehydo-pyromucic acid, and the like.

The following examples will describe in more detail the process involved for preparing both the 2-alkyl and 2-aryl methylenequinizarin.

EXAMPLE 1

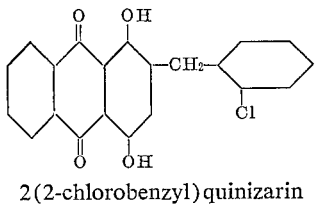

2(2-chlorobenzyl)quinizarin

Into a one-liter flask equipped with stirrer, thermometer and condenser there were charged 400 ml. of carbitol, 76 grams (0.525 mole) of 2-chlorobenzaldehyde and 112 grams (0.467 mole) of leucoquinizarin and the mixture heated to 85° C. to obtain a solution. To the solution there was then added 17 ml. of benzyltrimethyl ammonium hydroxide (35% in methanol) and the mixture kept at 90–100° C. for 6 hours. Thereafter, the reaction mixture was cooled to 30° C. and filtered. The filter cake was washed with methanol to remove the excess aldehyde and with water to remove the carbitol. The washed filter cake was then dried in an oven at 85° C. The yield was 160.5 grams, which amounted to 95% of theory based on the leucoquinizarin. The product had a melting point of 183–184° C., which is in agreement with the value of 183–184° C. reported by Marschalk et al. referred to above.

EXAMPLE 2

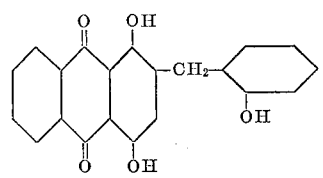

2(2-hydroxybenzyl)quinizarin

Into a 500 ml. flask equipped with stirrer, thermometer and condenser, there were charged 350 ml. of n-butanol, 18 grams (0.147 mole) of salicylaldehyde and the mixture heated to 80° C. To the solution there were added 5 ml. of benzyltrimethyl ammonium hydroxide (35% in methanol) followed by 32 grams (0.132 mole) of leucoquinizarin. The mixture was then heated at 80–85° C. for 7 hours and then cooled to 30° C., filtered and the filter cake washed with methanol. The filter cake was then dried in an oven at 85° C. The yield of the product was 38.3 grams, amounting to 84% of theory based on leucoquinizarin. The pure material has a melting point of 235–237° C. This product is a new compound, not having been previously synthesized.

EXAMPLE 3

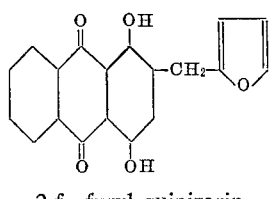

2-furfuryl quinizarin

Into a 500 ml. flask equipped with stirrer, thermometer and condenser, there were charged 150 ml. of carbitol, 32 grams (0.132 mole) of leucoquinizarin and the mixture heated to 90° C. to obtain a solution. To the solution were added 5 ml. of benzyl trimethyl ammonium hydroxide (35% in methanol) and dropwise 14 grams (0.146 mole) of 2-furaldehyde. The mixture was heated at 90–100° C. for 6½ hours, cooled to 10° C., filtered and the filter cake washed with methanol to remove the excess aldehyde. The filter cake was dried at 85° C. The yield of the product having a melting point of 160–166° C. was 36.2 grams amounting to 84% of theory based on leucoquinizarin. In this connection, it is interesting to note that Marschalk et al., referred to above, report a yield of 56.5% of theory based on leucoquinizarin.

EXAMPLE 4

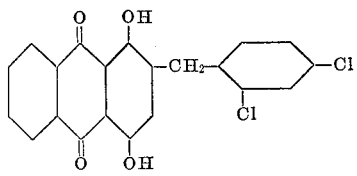

2-(2,4-dichlorobenzyl)quinizarin

Into a 150 ml. flask equipped with stirrer, thermometer and condenser there were charged 75 ml. of carbitol and 24.2 grams (0.10 mole) of leucoquinizarin and the mixture heated to 80–90° C. to obtain a solution. To the solution there were added 4 ml. of benzyl trimethyl ammonium hydroxide (35% in methanol) and 19.3 grams (0.11 mole) of 2,4-dichloro benzaldehyde and the mixture heated at 100–120° C. for 36 hours. Thereafter, the reaction mixture was cooled to 30° C., filtered and the filter cake washed with methanol and dried at 85° C. The yield of the bright red-orange crystals having a melting point of 181–182° C. was 34.6 grams, which amounted to 87% of theory based on leucoquinizarin. The chlorine analysis showed 17.3% of chlorine compared with the calculated percentage of 17.8. This, too, is a new compound, not having been previously synthesized.

EXAMPLE 5

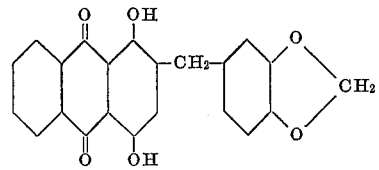

2 piperonyl quinizarin

The procedure of Example 4 was repeated with the exception that the 2,4-dichlorobenzaldehyde was replaced by 16.5 grams (0.112 mole) of piperonal. The yield of bright red-orange crystals with a melting point of 196–198° C. was 27 grams, amounting to 72% of theory based on leucoquinizarin. This is also a new compound, not having been previously synthesized.

EXAMPLE 6

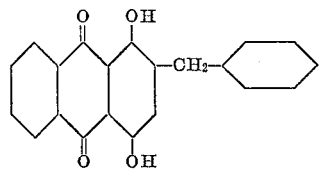

2-benzyl quinizarin

Into a 50 ml. flask equipped with stirrer, thermometer, and condenser there were charged 300 ml. of carbitol, 96 grams (0.397 mole) of leucoquinizarin and the mixture heated to 85° C. to obtain a solution. To the solution were then added 10 ml. of benzyl trimethyl ammonium hydroxide (35% in methanol) and dropwise at a temperature of 85–95° C., 44 grams (0.415 mole) of benzaldehyde. The mixture was then heated at 85–90° C. for a period of 7½ hours. Thereafter, the reaction mixture was cooled to 30° C., filtered and the filter cake washed with methanol and dried at 85° C. The yield of the product, having a melting point of 177–179° C., was 112.5 grams, amounting to 86% of theory based on leucoquinizarin. Marschalk et al., referred to above, report a yield of 45.5% of theory based on leucoquinizarin at a melting point of 180–181° C.

EXAMPLE 7

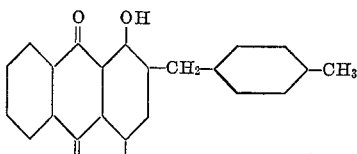

2(p-toluyl) quinizarin

Into a 500 ml. flask equipped with stirrer, thermometer, and condenser, there were charged 200 ml. of carbitol, 64 grams (0.264 mole) of leucoquinizarin and the mixture heated to 80–90° C. to obtain a solution. To the solution there were then added 10 ml. of benzyltrimethyl ammonium hydroxide (35% in methanol), followed by dropwise addition at 90–100° C. of 36 grams (0.30 mole) of p-tolualdehyde. The reaction mixture was maintained at 90–100° C. for a period of six hours. Thereafter, it was cooled to room temperature, filtered and the filter cake washed free of excess aldehyde with methanol, followed by a wash with cold water and then dried at 85° C. The yield of the product having a melting point of 176–178° C. was 76.1 grams, amounting to 84% of theory based on leucoquinizarin. Marchalk et al. reported a yield of 49% of theory and a melting point of 177–178° C.

EXAMPLE 8

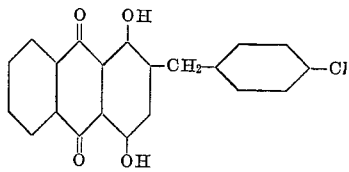

2(4-chlorobenzyl) quinizarin

Into a 500 ml. flask equipped with stirrer, thermometer and condenser, there were charged 150 ml. of carbitol and 21 grams (0.15 mole) of p-chlorobenzaldehyde and the mixture heated to 80° C. to obtain a solution. To the solution there were then added 5 ml. of benzyltrimethyl ammonium hydroxide (35% in methanol) and 32 grams (0.132 mole) of leucoquinizarin. The mixture was heated at 80–85° C. for 10½ hours, cooled to 30° C., filtered and the filter cake washed with methanol, then with water and dried at 85° C. The yield of the product having a melting point of 176–179° C. was 41.4 grams, amounting to 86% of theory based on leucoquinizarin. Chlorine analysis showed calculated 9.8% as compared with found 9.2%. This is a new product, not having been previously synthesized.

EXAMPLE 9

2-(p-anisyl) quinizarin

Into a 500 ml. flask equipped with stirrer, thermometer and condenser, there were charged 200 ml. of carbitol, 24.2 grams (0.10 mole) of leucoquinizarin, 5 ml. of benzyltrimethyl ammonium hydroxide (35% in methanol) and the mixture heated to 90° C. to obtain a solution. To the solution there were added dropwise 20.4 grams (0.15 mole) of p-anisaldehyde and the mixture kept at 90–100° C. for six hours. Thereafter, the reaction mixture was cooled to 30° C., filtered, and the filter cake washed with carbitol, followed by a wash with water and dried at 85° C. The yield of the product having a melting point of 140.5–142° C. was 21 grams, amounting to 58.5% of theory based on leucoquinizarin. This is also a new compound, not having been previously synthesized.

EXAMPLE 10

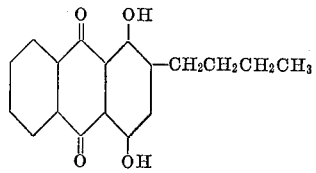

2-butyl quinizarin

Into a 500 ml. flask equipped with stirrer, thermometer and condenser there were charged 100 ml. of carbitol, 32 grams (0.132 mole) of leucoquinizarin, 5 ml. of benzyltrimethyl ammonium hydroxide (35% in methanol) and the mixture heated to 80° C. to obtain a solution. To the solution there were added dropwise 11.4 grams (0.158 mole) of n-butyraldehyde and the mixture heated at 80–90° C. for 7 hours. Thereafter, the reaction mixture was cooled to 30° C., filtered and the filter cake washed with carbitol and water and finally dried in an oven at 85° C. The yield of the product having a melting point of 124–125° C. was 33 grams, amounting to 85% of theory based on leucoquinizarin. Marschalk et al. report a yield of 65% based on leucoquinizarin and a melting point of 125° C.

EXAMPLE 11

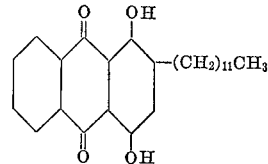

2-dodecyl (lauryl) quinizarin

The procedure of Example 10 was repeated with the exception that the n-butyraldehyde was replaced by 29 grams (0.158 mole) of lauryl aldehyde. The yield of the product having a melting point of 92.5–93.5° C. was 42 grams, amounting to 79% of theory based on leucoquinizarin. This likewise is a new compound, not having been previously synthesized.

EXAMPLE 12

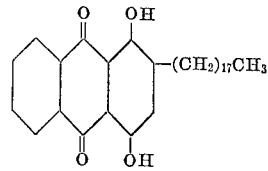

2-octadecyl (stearyl) quinizarin

Into a 500 ml. flask equipped with stirrer, thermometer and condenser, there were charged 100 ml. of carbitol, 45 grams (0.13 mole) of stearaldehyde sodium bisulfite addition compound and 24.2 grams (0.10 mole) of leucoquinizarin. To the mixture at room temperature there were added 65 grams of benzylthimethyl ammonium hydroxide (35% in methanol) and the mixture heated to 90° C. and then maintained at 90–100° C. for 6 hours. Thereafter, the reaction mixture was cooled to 30° C., filtered and the filter cake washed with hot ethanol to remove excess stearaldehyde and the product dried in an oven at 85° C. The yield of the pure product having a melting point of 98.5–101° C. was 23.5 grams, amounting to 48% of theory based on leucoquinizarin. This product is also a new compound, not having been previously synthesized.

EXAMPLE 13

2-butyl quinizarin

Into a 500 ml. flask equipped with stirrer, thermometer and condenser there were charged 100 ml. of carbitol, 56 grams (0.231 mole) of leucoquinizarin and the mixture heated to 80° C. to obtain a solution. To the solution there were 5 grams of sodium carbonate followed by the dropwise addition of 20 grams (0.278 mole) of n-butyraldehyde. The mixture was then heated at 90–100° C. for 7½ hours, cooled to 30° C., filtered and the filter cake washed with carbitol, methanol and water followed by drying of the filter cake in an oven at 85° C. The yield of the product having a melting point of 125–126.5° C. was 56 grams, amounting to 82% of theory based on leucoquinizarin.

EXAMPLE 14

2-butyl-quinizarin

The procedure of Example 13 was repeated with the exception that the sodium methoxide was replaced by 10 grams of sodium acetate. The yield of the product having a melting point of 126–127° C. was 53.2 grams, amounting to 78% of theory based on leucoquinizarin.

EXAMPLE 15

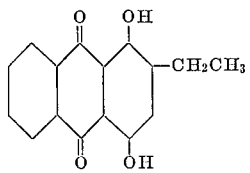

2-ethyl quinizarin

Into a 300 ml. reaction flask there were added 1,000 ml. of carbitol, 128 grams (0.53 mole) of leucoquinizarin, 20 ml. of benzyltrimethylammonium hydroxide (35% solution in methanol) and 100 ml. of acetaldehyde. The mixture was gradually heated to 90° C. and then maintained at 90°–100° C. for 8 hours. The reaction mixture was cooled to 30° C. and filtered and the filter cake washed first with carbitol, then with water and dried in an oven at 80°–90° C. Yield was 98.4 grams (70% of theory based on leucoquinizarin) of product, having a melting point of 168–169° C. Marschalk et al. report a yield of 62.5% of theory and a melting point of 168–169° C.

EXAMPLE 16

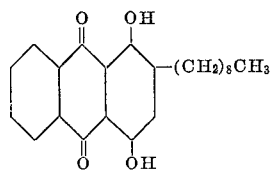

2-nonyl quinizarin

The procedure of Example 10 was repeated with the exception that the n-butyraldehyde was replaced by 22.4 grams (0.158 mole) of nonyl aldehyde. There was obtained 41.0 grams (85% of theory) of 2-nonyl quinizarin.

EXAMPLE 17

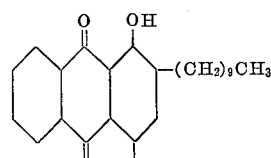

2-decyl quinizarin

Example 10 was again repeated with the exception that the n-butyraldehyde was replaced by 24.6 grams (0.158 mole) of decylaldehyde. Yield of product was 42.5 grams (85% of theory).

EXAMPLE 18

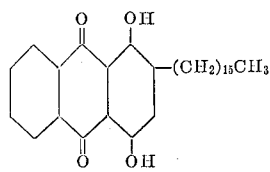

2-hexadecyl quinizarin

Example 12 was repated with the exception that the stearaldehyde sodium sulfite addition compound was replaced by 45 grams (0.13 mole) of hexadecylaldehyde sodium sulfite addition compound. Yield of product was 40 grams (86% of theory based on leucoquinizarin).

The quinizarins obtained in accordance with the present invention are useful dyestuff intermediates. They are readily condensed with aliphatic amines, preferably aromatic amines, in the conventional manner to yield reddish-blue dyestuffs for synthetic fibers.

I claim:

1. The process of preparing 2-alkyl- and 2-aryl-methylene quinizarins which comprises condensing 1 mole of leucoquinizarin with 1 to 1.5 moles of an aldehyde selected from the group consisting of saturated aliphatic aldehydes of from 1 to 18 carbon atoms, aromatic aldehydes containing from 1 to 3 fused benzene rings, the aldehyde group being attached directly to one of said benzene rings, and heterocyclic aldehydes of the furan series selected from the group consisting of 2-furaldehyde, tetrahydrofurfural and 5-aldehydo-pyromucic acid at a temperature ranging from 80° to 125° C. in the presence of a polar organic hydroxyl-containing solvent in which the leucoquinizarin and said aldehydes are soluble, selected from lower alcohols of from 2 to 4 carbon atoms, cellosolves and carbitols, and in the presence of a negative ion as catalyst selected from the class consisting of hydroxide ions, acetate ions and carbonate ions, for a period of time until the said condensation is complete.

2. The process of claim 1 wherein said aldehyde is a saturated aliphatic aldehyde of from 8 to 18 carbon atoms.

3. The process according to claim 2 wherein the aldehyde is laurylaldehyde.

4. The process according to claim 2 wherein the aldehyde is stearaldehyde.

5. The process according to claim 2 wherein the aldehyde is nonyl aldehyde.

6. The process according to claim 2 wherein the aldehyde is decylaldehyde.

7. The process according to claim 2 wherein the aldehyde is hexadecylaldehyde.

References Cited

Marschalk et al., Bull. Soc. Chem. France, 1936, pages 1545–1575 (1936).

Yates et al., J. Chem. Soc. (London), 1965, pages 626–629 (1965).

LORRAINE A. WEINBERGER, Primary Examiner

H. C. WEGNER, Assistant Examiner

U.S. Cl. X.R.

260—247.3, 347.8, 340.5